US006931339B1

(12) United States Patent
Olstad et al.

(10) Patent No.: US 6,931,339 B1
(45) Date of Patent: Aug. 16, 2005

(54) COMPASS AND COMMUNICATION SYSTEM

(75) Inventors: William D. Olstad, Panama City, FL (US); Dennis G. Gallagher, Southport, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/802,081

(22) Filed: Mar. 15, 2004

Related U.S. Application Data

(63) Continuation-in-part of application No. 10/699,426, filed on Nov. 3, 2003.

(51) Int. Cl.[7] .............................................. G01C 17/00
(52) U.S. Cl. .......................... 702/90; 702/92; 702/93; 702/95; 702/150
(58) Field of Search ............................... 702/90, 92, 93, 702/94, 95, 150, 151, 152, 153, 155; 367/131, 367/910; 248/179.1, 661

(56) References Cited

U.S. PATENT DOCUMENTS 6,162,191 A * 12/2000 Foxlin ........................ 600/595

* cited by examiner

Primary Examiner—John Barlow
Assistant Examiner—Meagan S Walling
(74) Attorney, Agent, or Firm—James T. Shepherd

(57) ABSTRACT

A system and method indicate azimuth of a diver to a remote console. A compass sensor module on a headgear worn by the diver has a two-axis gimbal mechanism provided with a protective housing around ring and two orthogonal axis structures. A magnetic field sensor unit mounted on one axis structure provides magnetic field data signals representative of the azimuth faced by the diver. A processor section of the compass module connected to the sensor unit provides azimuth data signals from the magnetic field data signals. A data transmission module has a conductor extending from the compass module to an amplifier and cable for amplifying azimuth data signals and remotely transmitting them. An acoustic transducer in the data module can also transmit azimuth data signals as acoustic signals through water. The console connected to the cable and water receives and displays the remotely transmitted azimuth data signals.

11 Claims, 3 Drawing Sheets

COMPASS AND COMMUNICATION SYSTEM

CROSS REFERENCE TO RELATED APPLICATION

This is a continuation-in-part of co-pending U.S. patent application entitled "Small Head-Mounted Compass System With Optical Display" by William d. Olstad et al., U.S. Patent and Trademark Office Ser. No. 10/699,426 (NC 84835), filed Nov. 3, 2003 and incorporates all references and information thereof by reference herein.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to a system for indicating horizontal orientation of an operator under conditions of impaired visibility. More particularly, this invention relates to a system partially mounted on headgear or equipment (dive masks, goggles, firefighting masks, helmets, head straps, backpacks, portable equipments) for indicating horizontal orientation or azimuth of a operator-wearer (diver and other workers) for real-time evaluations and advice by remote observers.

Some skilled workers such as divers, miners, rescue personnel etc. frequently perform their physically demanding tasks under highly dangerous and confined conditions that may include limited visibility. Often, the dangers created by these conditions are exacerbated by technically sophisticated/dangerous equipment and other hazardous circumstances at the recovery or work site. During a strenuous and intensive effort, situations can arise outside of the expertise of the worker that need inputs from one or more cognizant experts to successfully complete a task. The effectiveness of the advice from the expert usually is based on information from the worker that is unmistakable.

For example, during salvage of complicated and highly explosive ordnance from great depths, divers often need technical assistance and guidance from structural experts concerning specifics of the construction of the craft that carried the ordnance to safely remove the items of interest. Technical assistance from ordnance experts may also be needed for safely handling and bringing the ordnance items to the surface after their removal.

The technical experts located a safe distance away can transmit needed technical information to a diver or other worker at the site by contemporary communication systems. However, since much of a work site can be at least partially obscured, the diver often may be unable to describe his location or the surrounding structures with sufficient accuracy to enable the distant experts to correctly evaluate the situation and properly advise the diver. Existing techniques for getting diver azimuth to surface require the diver to stop what he is doing, find his compass, orient compass, read compass (if possible) and verbally transmit reading to surface using a hardwire or acoustic communication system. This process is awkward, inefficient, prone to error, a potential safety hazard, and is not real time.

The experts on the surface may be unable to determine if a diver is looking one way toward one end of a submerged chamber at an empty container or the other way at a similarly appearing container filled with unstable explosives at the other end of the chamber. Disastrous consequences could follow by giving the wrong technical advice since it is not clear exactly which way or where the diver is looking.

Thus, in accordance with this inventive concept, a need has been recognized in the state of the art for a system providing continuous, compass data representative of horizontal orientation or azimuth of a worker such as a diver and communicating this azimuth data to a remote location for evaluation and responsive action.

OBJECTS AND SUMMARY OF THE INVENTION

An object of the invention is to provide a system providing continuous, compass data representative of horizontal orientation or azimuth of a diver and communicating this azimuth data to a remote location for evaluation and responsive action.

Another object is to provide a system providing information of azimuth that does not require an operator to maintain a predetermined physical attitude.

Another objective is to provide a system for providing data representative of the azimuth of a diver for remote evaluation of a task and advice concerning the task by technical experts.

Another object of the invention is to provide a compact and rugged system partially carried on a headgear or other equipment to provide data representative of heading or direction faced for more responsive evaluation of reported information at a remote location.

Another object of the invention is to provide a compact system having a compass sensor module on a worker and communications module linking the compass module to a remote location.

Another object of the invention is to provide a compass and communications system to help perform undersea tasks in a safer and more efficient manner with better and more thorough results.

These and other objects of the invention will become more readily apparent from the ensuing specification when taken in conjunction with the appended claims.

Accordingly, the present invention is for a compass and communication system to transmit azimuth data representative of heading of an operator such as a diver to a remote location on a surface craft. A compass sensor module has a waterproof housing and a mounting mechanism on the housing to engage a headgear worn at the back of a diver's head. A two-axis gimbal mechanism inside the waterproof housing has a protective housing connected to the waterproof housing and contains ring structure and two orthogonal axis structures. A magnetic field sensor unit is mounted on one of the axis structures and provides magnetic field data signals representative of the direction or azimuth faced by the diver. The mounting mechanism transmits horizontal yawing motions of the diver to the gimbal mechanism and magnetic field sensor unit. A processor electronics section of the compass sensor module is connected to the magnetic field sensor unit to provide data signals representative of azimuth from the magnetic field data signals. A data transmission module has an electrically insulated conductor connected to the compass sensor module and an amplifier stage for amplifying an electromagnetic form of the azimuth data signals and an electrically insulated cable extends from the amplifier stage for remotely transmitting the electromagnetic azimuth signals. An acoustic transducer in the data transmission module is connected to the amplifier stage to transmit the azimuth data signals as acoustic signals through ambient water to the remote location. A transceiver/display console at the remote craft is connected to the cable and water to receive and display the remotely transmitted azimuth data signals.

DESCRIPTION OF THE PREFERRED EMBODIMENTS

Figure 1:
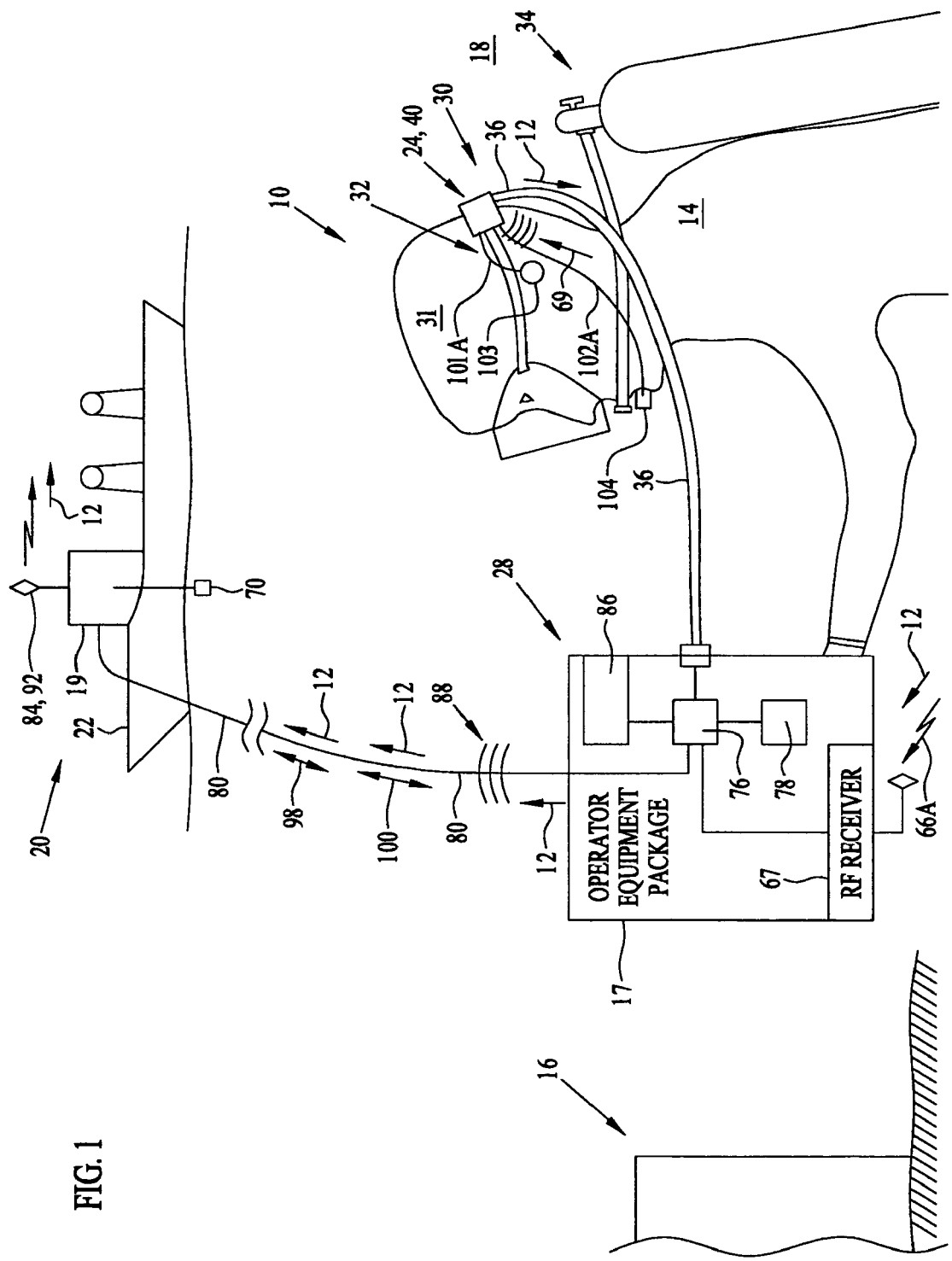
FIG. 1 is a schematic side view of the compass and communication system of the invention having a compass sensor module mounted on the back part of a headgear such as a diving face mask and a communications module mounted partially on an operator's equipment package.

Referring to FIG. 1, compass and communication system 10 of the invention is for communicating data (shown as arrow 12) representative of heading in the horizontal plane or azimuth of a diver 14 submerged at a work site 16 that can be deep in water 18. Compass and communication system 10 can input azimuth data 12 to diver-carried equipment 17 that may be used to perform tasks at work site 16 or could input data 12 to other operator equipment such as sonar, head-mounted display, etc. that could utilize such data 12 at the site. Compass and communication system 10 can also be used to provide azimuth data 12 for other workers such as miners underground, firefighters and/or rescue workers in visually challenging surroundings (i.e. in darkness, turbid water, smoke, fog, or other obscurants) or other location that is not observable from without.

Compass and communication system 10 generates and transmits data 12 representative of azimuth of the worker-diver 14 to transceiver/display console 19 at a remote location 20, such a surface support craft 22 on water 18 or to submerged platform (not shown) during clandestine operations. Azimuth data 12 at remote location 20 can be viewed by technical experts in marine geology, structures, and ordnance, for example. Because a diver's heading often is indeterminable during diving operations, azimuth data 12 can be the only means available to apprise the observers which direction diver 14 is looking and which side of a structure or chamber in a sunken craft is being observed. Consequently, observers having azimuth data 12 are better informed to evaluate additional oral and/or visual communications from diver 14 and can give diver 14 more meaningful technical guidance regarding safer and more effective salvage or work procedures may be given to diver 14.

Compass and communication system 10 has a compass sensor module 24 that generates azimuth data 12 for transmission through water 18 or air 26 via a data-transmission module 28. Compass sensor module 24 is mounted at the back 30 of the head 31 on a headgear 32 that can include straps connected to diving facemasks (as depicted), goggles, firefighting masks, helmets, etc. and stand-alone head-strap-and-bracket assemblies. Optionally, compass sensor module 24 could be mounted on diver-carried equipment 17 for performing tasks at work site 16 or could input data 12 to other operator equipment such as sonar, head-mounted display, or compass sensor module 24 could be mounted on a portable life-support apparatus 34 such as a compressed air tank, re-breather unit, etc. to indicate the direction diver 14 is facing.

Compass sensor module 24 has an electrically insulated conductor 36 connected to feed data 12 to data-transmission module 28 that partially can be held by diver 14. Data-transmission module 28 also could be located partially on head 31 alongside of compass sensor module 24 or be mounted on equipment 17 or life-support apparatus 34.

Figure 2:
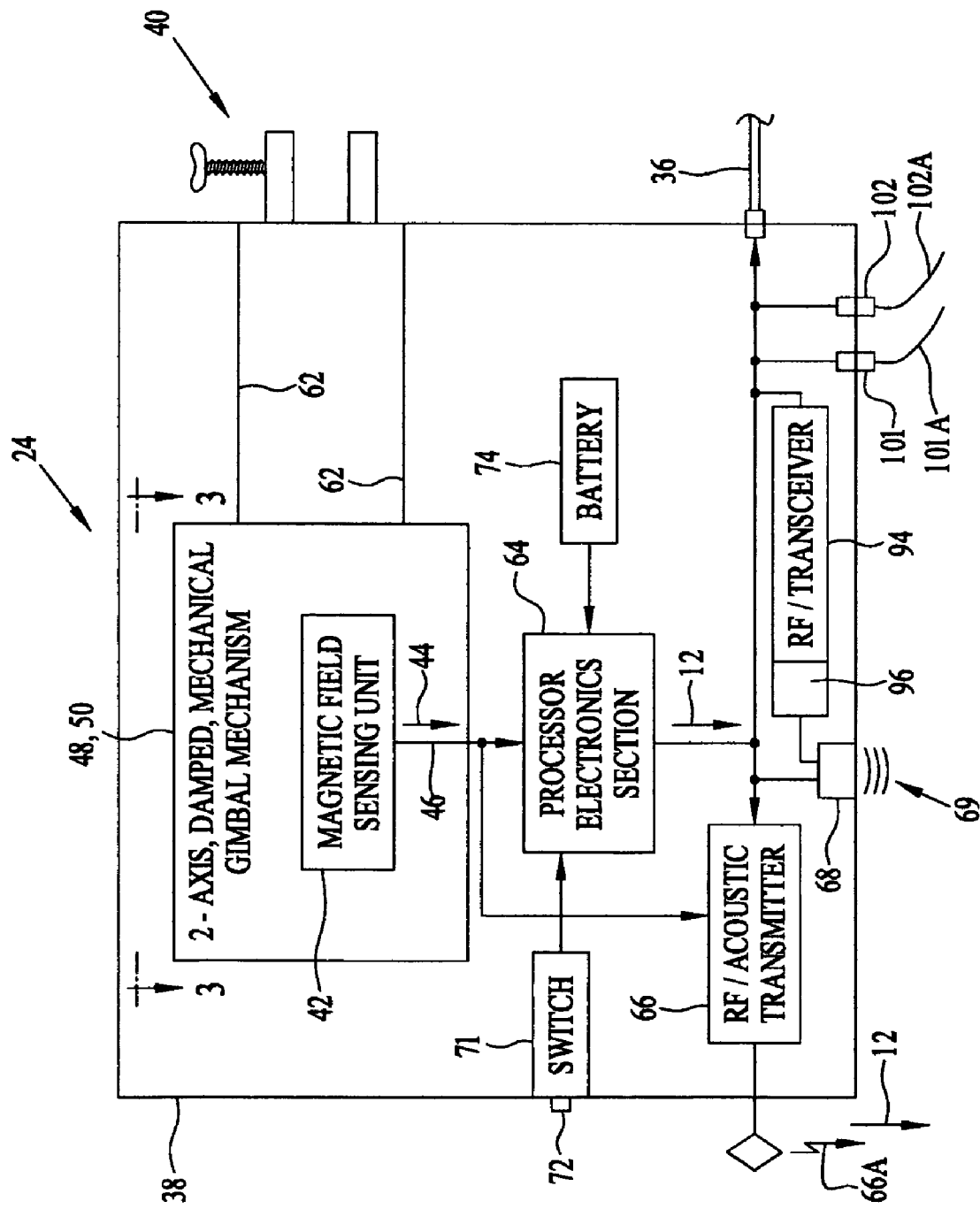
FIG. 2 is a block diagram of the compass sensor module of the invention.

Referring also to FIG. 2, compass sensor module 24 can be substantially the same as disclosed with regard to the compass system in the referenced co-pending application supra and can be contained in a small waterproof housing 38 that may be depth rated to about 200 feet in salt water. Compass sensor module 24 has a clamp-like mounting mechanism 40 to hold module 24 on headgear 32 or on life support apparatus 34. Compass sensor module 24 might also be mounted on diver-carried equipment 17, for example a film or video camera or search sonar. Azimuth data 12 representative of compass headings could be sent topside along with scanned video/sonar information data to permit correlation of the scanned information data and the azimuth data 12 for more responsive real-time evaluations by experts topside.

Waterproof housing 38 of compass sensor module 24 contains a miniature electronic, two-axis, magnetic field sensor unit 42 which provides magnetic field data signals (shown as arrow 44) over electrical cable 46. Magnetic field data signals 44 are indicative or representative of the direction or azimuth faced by diver-operator 14. A typical, commercially available off the shelf two-axis magnetic field sensor module that can be used for magnetic field sensor module 42 is known as the PNI MicroMag 2-axis Magnetic Sensor Module Part Number 11594 manufactured by PNI Corporation of 5464 Skylane Blvd., Suite A, Santa Rosa, Calif. 95403.

Magnetic field sensor unit 42 is mounted on a two-axis gimbal mechanism 48 in waterproof housing 38 to allow a wide range of movement by diver 14 without degrading the accuracy of magnetic field sensor unit 42. Two-axis gimbal mechanism 48 can be a scaled-down version of many well known mechanically gimbaled and damped self-leveling systems. These leveling systems create damped, substantially level platforms for instrumentations, and typically, they are used as the supports for ships' compasses to dampen motions from them, or they may be for gyros or other applications where such supports are needed. See for example U.S. Pat. No. 4,318,522.

Two-axis gimbal mechanism 48 could be like the gimbal of prior art shown in FIG. 1 of the '522 patent. Two-axis gimbal mechanism and could provide the requisite leveling and yaw detection (horizontal, azimuth sensing) capabilities for magnetic field sensor unit 42 by miniaturizing the '522 structure of FIG. 1 and substituting magnetic field sensing unit 42 for the object that looks like a rolling-pin. Miniaturization of such a self leveling system to meet the size constraints of compass sensor module 24 is within the scope of one skilled in the art without calling for anything more than the exercise of ordinary skill and does not require undue experimentation. The details of mounting magnetic field sensor module in two axis gimbal mechanism are set forth in the above referenced co-pending application and are incorporated by reference herein.

Figures 3, 4:
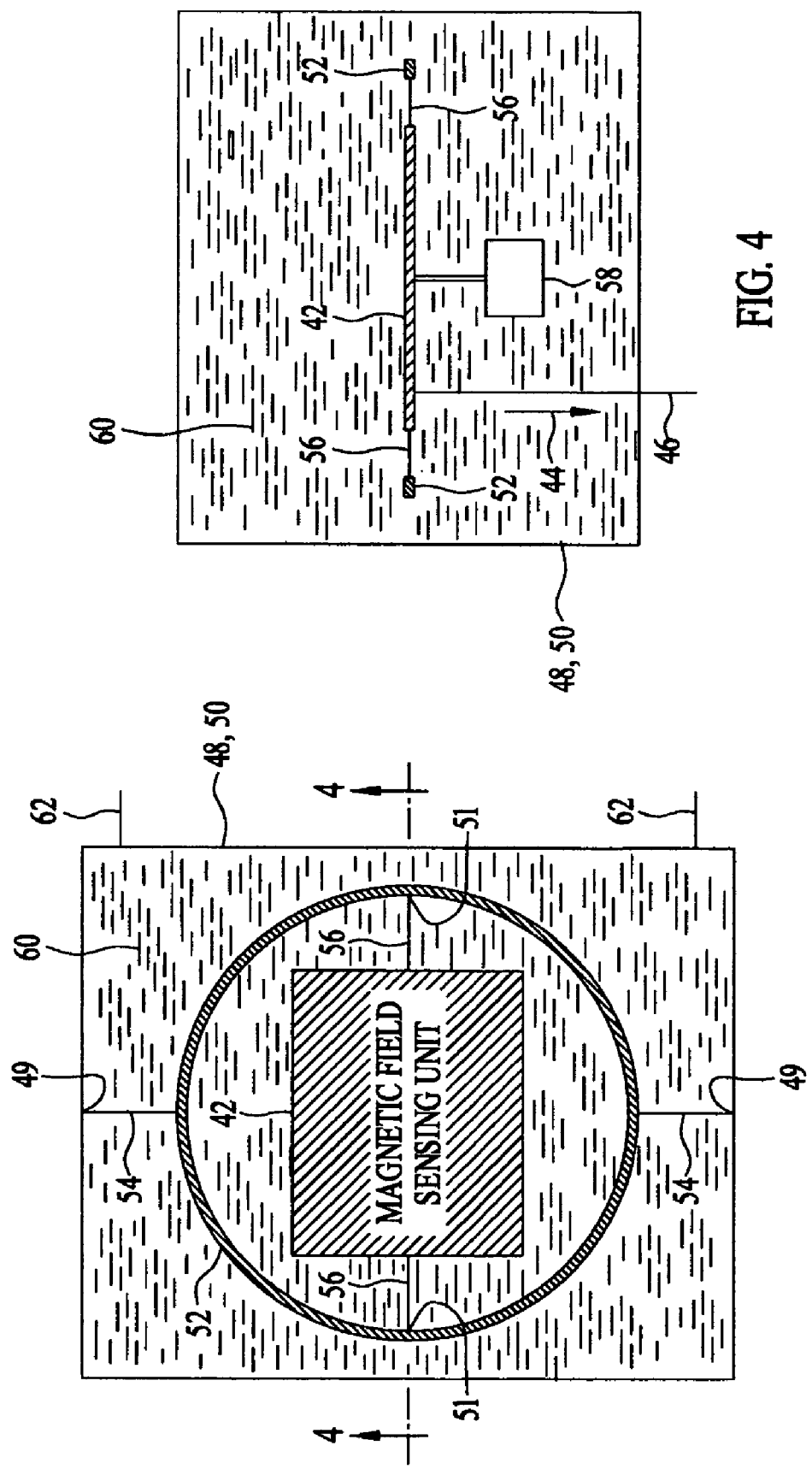
FIG. 3 is a schematic cross-sectional top view of a two-axis damped mechanical gimbal mechanism supporting a magnetic field sensing unit taken generally along line 3—3 in FIG. 2.
FIG. 4 is a schematic cross-sectional side view of a two-axis damped mechanical gimbal mechanism supporting a magnetic field sensing unit taken generally along line 4—4 in FIG. 3.

Referring also to FIGS. 3 and 4, magnetic field sensor unit 42 is mounted in a protective housing 50 of gimbal mechanism 48 via a ring structure 52 coupled to two orthogonal axis structures 54 and 56 of gimbal mechanism 48. Pivot points 49 are at opposite ends of axis structure 54 to allow rolling motions of magnetic field sensor unit 42, and pivot points 51 are at opposite ends of axis structure 56 to allow pitching motions of magnetic field sensor unit 42. Thus, magnetic field sensor unit 42 stays substantially level regardless of the pitch and roll of compass sensor module 24 during movement of diver-operator 14. A ballasting counterweight 58 is connected to the bottom of magnetic field sensor unit 42. Counterweight 58 is rigidly attached to and hangs from unit 42 and helps keep unit 42 level and prevents oscillations of unit 42 by pitching and rolling motions of diver 14. Protective, sealed housing 50 can be filled with an oil-like non-reactive fluid 60 to dampen the movement of magnetic field sensor unit 42 so that it does not oscillate as diver 14 goes from one place to another and/or performs tasks. These features allow diver 14 a wide range of pitch and roll motions of up to +/−90° without degrading the accuracy of magnetic field sensor unit 42.

Protective housing 50 is connected at points 62 to waterproof housing 38 (only two of which are depicted in FIGS. 2 and 3), and housing 38 is securely connected to headgear 32 at the back 30 of head 31 by mounting mechanism 40. Consequently, any horizontal yawing motions (or changes in azimuth) of diver 16 are transmitted to gimbal mechanism 48 and magnetic field sensor unit 42 so that the azimuth or direction diver 14 is facing can be sensed by sensor unit 42 that generates responsive magnetic field data signals 44. This generation is because yawing motions in the horizontal plane (changes in azimuth) by diver 1416 are not compensated for by gimbal mechanism 48. Thus, magnetic field sensor unit 42 is able to sense rotational motion and different directional headings or facings of diver 14 as diver 14 turns left or right (yawing motion). Magnetic field sensor unit 42 responsively generates directional magnetic field data signals 44 that can be representative of the azimuth or direction diver 14 faces in the horizontal plane during progression from one location to another or while at a particular undersea location.

A processor electronics section 64 is connected to magnetic field sensor unit 42 via electrical cable 46 to receive magnetic field data signals 44. Processor section 64 reads magnetic field data signals 44, makes calculations using previously stored calibration data to yield the compass heading (azimuth), and provides an output as representative azimuth data signals (shown as arrow 12) in the proper format to data transmission module 28 over its electrically insulated conductor 36. Optionally, compass sensor module 24 can also have a small, multi-function wireless RF/acoustic transmitter 66 to transmit data signals 12 in electromagnetic form 66A a short distance through water 18 to a small wireless RF receiver 67 of data transmission module 28 that is connected to amplifier 76. As a further option, multi-function RF/acoustic transmitter 68 in compass sensor module 24 could acoustically transmit data signals 12 through acoustic transducer 68 as acoustic signals 69 through water 18 to acoustic transducer/transceiver 86 in data transmission module 28, or directly transmit acoustic signals 69 to an acoustic transducer transceiver 70 on remotely located craft 22. However, an unacceptable number of additional batteries might be needed at module 24 for directly, acoustically transmitting to craft 22.

Compass sensor module 24 has a switch 71 connected to processor section 64. A push-button 72 from switch 71 extends through housing 38 to permit diver-operator 14 to selectively turn-on or turn-off compass sensor module 24 as desired. Button 72 of switch 71 is coupled to processor section 64 that is connected to battery 74 for electrical power when diver 14 pushes button 72 to turn-on compass sensor module 24. Processor section 64 also connects magnetic field sensing unit 42 to battery 74 via electrical cable 46 to activate it when button 72 is displaced by diver 14.

Representative data signals 12 from compass sensor module 24 are connected to a data transmission module 28 via its conductor 36 or through water 18. Data transmission module 28 is shown as being partially hand held by diver 14 along with equipment package 17. Module 28 and/or equipment 17 can be carried or otherwise transported by diver 14 at other places on the body or by undersea transport vehicles at or near the work site.

Data transmission module 28 includes an interconnected amplifier 76 and battery power supply 78 connected to conductor 36 and a remotely extending electrically insulated cable 80. Amplified data signals 12 from amplifier 76 are coupled via cable 80 to transceiver/display console 19 on craft 22 for display and evaluation or relay of azimuth data 12 via RF antenna 84 to another remote location or satellite (not shown). Data transmission module 28 could additionally have an acoustic transducer/transceiver 86 for transmitting data signals 12 as acoustic signals 88 through ambient water 18 to acoustic transducer/transceiver 70 connected to transceiver/display console 19 or to appropriate acoustic receivers carried by others in water 18. Either mode of transmission assures that technical observers on craft 22 can use the information of azimuth data signals 12 and be apprised of the direction faced by diver 14 at work site 16.

In operation, diver-operator 14 turns on compass sensor module 24 by pushing push-button 72 of switch 71. The horizontal X and Y components of the earth's magnetic field are sensed by magnetic field sensor unit 42 which is kept steady and level by being mounted on two-axis damped, mechanical gimbal mechanism 48. Magnetic field signals 44 are generated and are coupled over cable 46 to processor electronics section 64 which reads signals 44 and generates compass heading or azimuth data signals 12 based on previously stored calibration data. Processor section 64 couples representative compass heading azimuth data signals 12 via cable 36 to to data transmission module 28 where data signals 12 are transmitted remotely via cable 80 or water 18 to console 19 on craft 22. There data 12 can be displayed for evaluation and responsive action by technical experts or relayed via antenna 92 to a more distant facility.

Compass and communication system 10 of the invention is compact and out-of-the-way to not distract a worker. System 10 of the invention does not interfere with the completion of tasks in intense work environments under dangerous, mentally and physically demanding conditions of obscured visibility that may approach zero. Miners and rescue workers can also benefit from being equipped with compass and communication system in their dangerous work environment that may need an expert's advice.

These workers as well as diver 14 could additionally have bidirectional electromagnetic voice communications with experts at remote locations. For surface workers, a small radio transceiver 94 having an acoustic microphone/speaker 96 in compass sensor module 24 can be connected to cable 80 of data transmission module 28 to allow bidirectional electromagnetic communications of information (shown as bidirectional arrow 98) between them and experts near console 19. For divers, cable communications to a commercially available diver acoustic headset 103 and microphone equipment 104 would be made over insulated conductors 101A and 102A to ports 101 and 102 on compass sensor module 24. These communications 98 and azimuth data 12 are in real time to assure safe and successful completion of a task at site 16 regardless of ambient visual environmental conditions (i.e. darkness, turbid water, smoke, fog, and any other opaque obscurants).

Acoustic transducer/transceiver 86 of data transmission module 28 and transducer/transceiver 70 on craft 22 also can permit bidirectional communications in the form of bidirectional acoustic communications (shown as bidirectional arrow 100) that are transmitted through ambient water 18 between diver 14 and craft 22. Bidirectional acoustic communications 100 and azimuth data 12 sent as acoustic signals 88 are in real-time for safer and more successful operations.

Compass and communication system 10 of the invention is small, self-contained, waterproof and ruggedized to allow its reliable operation during salvage operations or at potential underwater crime scenes for example. System 10 of the invention provides diver heading (or where diver is looking in this case) information as data 12 to topside experts and other support personnel via wire 80 or water 18 transmitting acoustic signals 88. Topside personnel can monitor the direction of travel of diver 14 and area coverage if diver 14 is in a navigation mode (swimming with head aligned with body) during search and rescue sweeps at an underwater crime scene. If diver 14 stops moving during the sweeps, topside experts might determine that there a problem has developed which could be resolved from a standpoint of safety. If diver 14 finds the targeted item, diver 14 can provide topside experts at remote location 20 with a rough "mapping" of scene of the targeted area. This mapping is transferred via verbal information via acoustic data signals 100 from acoustic transducer/transceiver 86 or electromagnetic information signals 98 over cable 80 along with real-time azimuth data signals 12 over a possible 360° sweep from a given point as diver 14 says what is being observed. This sort of complete information could be highly useful by those involved in underwater archeological research. Complete search of an area with no overlooked spots can be coordinated.

Compass and communication system 10 could benefit diver 14 from having a display of azimuth data 12 at diver equipment package 17 or at a display such as referred to above in the co-pending application. Since experts at topside have real-time verbal communications and azimuth data 12 at transceiver/display console 19, diver 14 and topside experts can discuss the information and make appropriate adjustments as a situation develops.

Having the teachings of this invention in mind, modifications and alternate embodiments of compass and communication system 10 may be adapted without departing from the scope of the invention. Its uncomplicated, compact design that incorporates structures long proven to operate successfully lends itself to numerous modifications to permit its reliable use in hostile and demanding marine and underground applications where impaired visibility greatly complicates effective action. Compass and communication system 10 can be made from a wide variety of materials for resistance to corrosion, strength to bear up during routine abuse, and to provide long term reliable operation under a multitude of different operational conditions and requirements.

The disclosed components and their arrangements as disclosed herein, all contribute to the novel features of this invention. Compass and communication system 10 of the invention provides a reliable and capable means for improving the effectiveness of workers and reducing the hazards associated with operations under highly dangerous conditions that include near zero visibility. Therefore, compass and communication system 10, as disclosed herein is not to be construed as limiting, but rather, is intended to be demonstrative of this inventive concept.

It should be readily understood that many modifications and variations of the present invention are possible within the purview of the claimed invention. It is to be understood that within the scope of the appended claims the invention may be practiced otherwise than as specifically described.

claims

We claim:

1. A compass and communication system to transmit azimuth data to a remote location comprising:
   a compass sensor module having:
      a waterproof housing;
      a mounting mechanism on said housing to engage a headgear worn by an operator;
      a two-axis gimbal mechanism inside said waterproof housing, said two-axis gimbal mechanism having a protective housing connected to said waterproof housing, said protective housing containing ring structure and two orthogonal axis structures;
      a magnetic field sensor unit mounted on one of said axis structures, said magnetic field sensor module providing magnetic field data signals representative of the direction faced by the operator, said mounting mechanism transmits horizontal yawing motions of the operator to said gimbal mechanism and said magnetic field sensor unit; and
      a processor electronics section connected to said magnetic field sensor unit providing data signals representative of azimuth from said magnetic field data signals; and
   a data transmission module having:
      an electrically insulated conductor connected to said compass sensor module;
      an amplifier stage connected to said insulated conductor for amplifying said azimuth data signals;
      an electrically insulated cable extending from said amplifier stage for remotely transmitting said azimuth signals thereon; and
      a transceiver/display console at a remote location connected to said cable to receive and display said remotely transmitted azimuth data signals.

2. The system of claim 1 further comprising:
   an RF transmitter in said compass sensor module coupled to receive
      said azimuth signals and transmit them in RF form and an RF receiver in said data transmission module to receive said RF
      form of said azimuth signals and couple them to said amplifier stage.

3. The system of claim 2 further comprising:
   an acoustic transducer in said data transmission module being connected to said amplifier stage to transmit said azimuth data signals as acoustic signals through ambient water to said remote location.

4. The system of claim 3 wherein said acoustic transducer is an acoustic transceiver/transducer, said operator is a diver in water, said transceiver/display console is at said remote location on a surface craft, and said acoustic transducer/transceiver communicates acoustic signals through said water between said diver and said craft.

5. The system of claim 4 further comprising:
a battery for supplying electrical power in said waterproof housing;
a switch in said protective housing having a push-button extending through said waterproof housing, said push button connecting said processor electronics section to said battery to turn-on said compass sensor module; and
an antenna on said console for relaying said azimuth data.

6. The system of claim 5 further comprising:
an RF transceiver having a microphone/speaker in said compass sensor module connected to said conductor to permit voice communications between said diver and said craft.

7. The system of claim 6 further comprising:
a counterweight connected to the bottom of said magnetic field sensor unit; and
a fluid filling said protective housing around said magnetic field sensor unit.

8. The compass system of claim 7 wherein said counterweight hangs on rigid attachment from said magnetic field sensor unit to help keep it level and prevent oscillations by pitching and rolling motions of said diver, and said fluid dampens movement of said magnetic field sensor unit to allow said diver a wide range of pitch and roll motion without degrading the accuracy of said magnetic field sensor unit.

9. A system for generating and communicating azimuth data representative of heading of an operator to a remote location comprising:
means for providing a waterproof housing;
means for engaging a headgear worn by an operator, said engaging means being mounted on said waterproof housing providing means;
means for securing a two-axis gimbal mechanism inside said waterproof housing providing means, said two-axis gimbal mechanism creating means having a protective housing connected to said waterproof housing providing means, said protective housing containing ring structure and two orthogonal axis structures;
means for sensing magnetic fields mounted on one of said axis structures, said magnetic field sensing means providing magnetic field data signals representative of the direction faced by the operator;
means for processing data having a processor electronics section connected to said magnetic field sensing means for providing data signals representative of azimuth from said magnetic field data signals;
means for providing an electrically insulated conductor being connected to said processing data means;
means connected to said insulated conductor means for amplifying an electromagnetic form of said azimuth data signals;
means extending from said amplifying means for remotely transmitting said electromagnetic azimuth data signals on an insulated cable; and
means coupled to said insulated cable for receiving and displaying said remotely transmitted electromagnetic azimuth data signals at a remote location.

10. The system of claim 9 further comprising
means coupled to receive said azimuth data signals from said processing means for transmitting them in RF form;
means for receiving said RF form of said azimuth data signals and coupling them to said amplifying means;
means coupled to said amplifying means for transmitting said azimuth data signals as representative electromagnetic signals through water; and
means coupled to said amplifying means for transmitting said azimuth data signals as representative acoustic signals through water.

11. A method of sensing azimuth and communicating data representative direction faced by a diver in water comprising the steps of:
providing a compass sensor module having a waterproof housing;
engaging a headgear worn by an diver by a mounting mechanism on said waterproof housing to position said compass sensor module on the back of the head of said diver;
securing a two-axis gimbal mechanism inside said waterproof housing of said compass sensor module, said two-axis gimbal mechanism having a protective housing connected to said waterproof housing, said protective housing containing ring structure and two orthogonal axis structures;
sensing magnetic fields representative of the direction faced by said diver by a magnetic field sensor unit mounted on one of said axis structures, said magnetic field sensor unit providing magnetic field data signals representative of the direction faced by said diver;
providing azimuth data signals from said magnetic field data signals by a processor electronics section in said compass sensor module;
coupling said azimuth data signals over a conductor to an amplifier stage of a data transmission module;
transmitting said azimuth data signals as electromagnetic signals on an insulated cable of said data transmission module to a surface craft at a remote location;
transmitting said azimuth data signals as acoustic signals through said water; and
displaying said transmitted azimuth data signals at said remote location on a console.

* * * * *